Nov. 15, 1966

L. F. GILBERT 3,286,093

FLAME DETECTOR SYSTEM USING A LIGHTLY
LOADED GLOW DISCHARGE DETECTOR TUBE

Original Filed Nov. 2, 1962

INVENTOR.
LYMAN F. GILBERT

BY *Eldon H. Luther*

ATTORNEY

INVENTOR.
LYMAN F. GILBERT
BY Eldon H. Luther
ATTORNEY

United States Patent Office 3,286,093
Patented Nov. 15, 1966

3,286,093
FLAME DETECTOR SYSTEM USING A LIGHTLY LOADED GLOW DISCHARGE DETECTOR TUBE
Lyman F. Gilbert, Hazardville, Conn., assignor to Combustion Engineering, Inc., Windsor, Conn., a corporation of Delaware
Continuation of application Ser. No. 235,098, Nov. 2, 1962. This application July 22, 1966, Ser. No. 567,310
7 Claims. (Cl. 250—83.6)

This application is a continuation of my copending application Serial Number 235,098, filed November 2, 1962, now abandoned.

This invention relates generally to electrical flame detectors operative to continuously detect the presence or absence of a flame within a furnace. The invention is particularly concerned wth detectors of the type employing glow discharge sensing tubes which are positioned to "see" the flame and receive their firing energy from the flame.

In accordance with the present invention there is provided an electronic flame detector which has a minimum of circuit components and which is extremely reliable in its operation. The detector is far more sensitive than prior art detectors of the same general type and is so designed that only the detector tube, i.e., the glow discharge tube, need be mounted on the furnace.

The flame detector of the invention includes what may be termed a transmitter that generates a pulse signal incident to avalanche occurring in the detector tube which pulse is separated from the A.C. supply and coupled into what may be termed a receiver as set input signal therefor and with the output or load of the receiver being energized as long as the pulse output of the transmitter is produced.

It is an object of the invention to provide an improved electronic flame detector system.

A further object of this invention is to provide such an improved system utilizing a minimum of electrical components and having a maximum of reliability.

Another object of the invention is to provide such a flame detector system which is extremely sensitive to the detection of a flame in a furnace and which is so arranged that a minimum of components are required to be mounted on the furnace.

Other and further objects of the invention will become apparent to those skilled in the art as the description proceeds.

With the aforementioned objects in view, the invention comprises an arrangement, construction and combination of the elements of the inventive organization in such a manner as to attain the results desired as hereinafter more particularly set forth in the following detailed description of an illustrative embodiment, said embodiment being shown by the accompanying drawings wherein.

Figure 1:
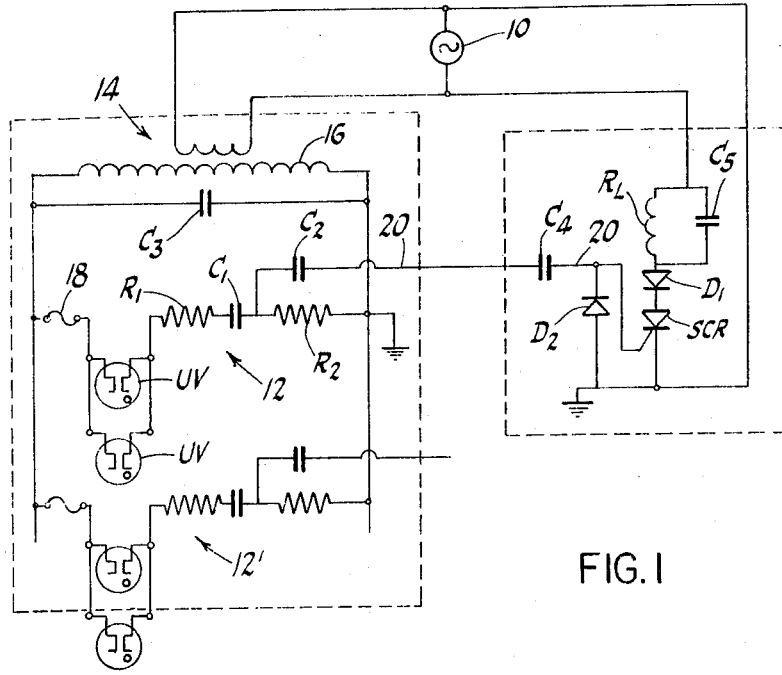
FIGURE 1 is a circuit diagram of the present invention.

Referring to the diagram of FIGURE 1 there is provided a source of A.C. potential identified as 10 and which is effective to power the transmitter 12 of the flame detector through the transformer 14, with the transformer stepping up the voltage of the source, such as from 118 v. A.C. to 750 v. A.C. The frequency of this supply may be the readily available 60 cycles per second. Connected across the secondary 16 of the transformer are one or more glow discharge tubes UV. In series with this tube UV are fuse 18, resistors $R_1$ and $R_2$, and capacitor $C_1$. ($R_2$ may also be a small transformer or inductor.) With this circuit the tube UV is lightly loaded so that it may partially conduct and recover, returning to its high impedance state. The operation thus obtained may be that shown in the FIGURE 2 wave form illustrations wherein the voltage spikes are shown riding on the 60 cycle A.C. supply of the UV tube and wth these spikes representing the surges or pulses produced incident to firing (avalanche) of the tube. These pulses produce shock excitation of the circuit with the ringing or alternations at the trailing edge of the pulse gradually being damped out.

Figure 2:
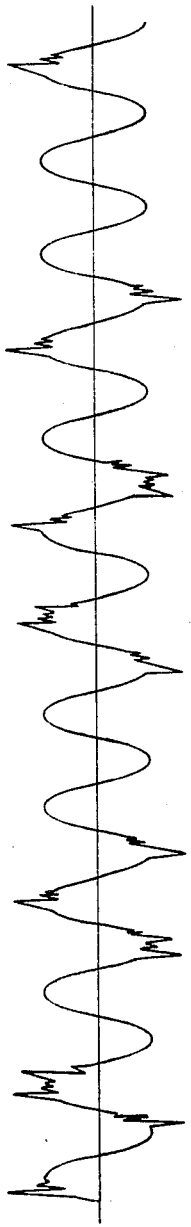
FIGURE 2 depicts the wave form produced in the transmitting circuit incident to the firing of the glow discharge tube where the tube is not heavily loaded.

The wave form depicted in FIGURE 2 illustrates the UV tube operating out of saturation, i.e., so that firing of the tube is not uniformly effected during every alternation of the supply potential but with a random firing being effected. It will be understood that the tube may also be operated in saturation where the tube fires with every alternation of the supply. The criterion as to whether or not the tube operates in or out of saturation depends upon its position with relation to the flame being sensed plus the voltage applied to the UV tube. The energy being sensed follows the inverse square law of radiation and therefore the signal strength will vary inversely as the square of the distance between the sensing tube and the flame. The scanning angle which the sensing tube has to view the flame also affects the energy received directly as the square of the diameter of the circle viewed at the point of the flame envelope.

The sensitivity of the tube may also be adjusted by varying the supply voltage to the transmittter circuit by adjusting the supply voltage of transformer 14. Thus, depending upon the relative position of the tube to the flame and the magnitude of the voltage applied to the tube, the firing rate may be random as shown in FIGURE 2 or may be that produced through operation in the saturation condition of the tube.

It is found that for the flame produced by gas, oil or coal firing (or firing of any hydrocarbon fuel), a tube having an energy sensitive spectrum range of 2000 Angstroms to 3300 Angstroms operates satisfactorily. The glow discharge tube, i.e., UV, operates on a breakdown mechanism across a threshold potential with what is termed a Townsend avalanche occurring at breakdown. Thus when a photon of proper energy content, i.e., proper wavelength, enters the tube it causes ionization of the gases therein resulting in a very rapid acceleration of electrons across the potential gap of the detector tube. In analyzing the operation of the circuit in which the glow discharge tube is disposed it was found that the speed of the pulse produced by the Townsend avalanche and which is reflected back through the circuit (through shock excitation) has a duration of less than .5 microsecond (corresponding to a frequency of better than 2 megacycles). It was thus determined that this pulse could be readily separated from the supply voltage and employed in the receiver of the flame detector as the input signal therefor thereby rendering the transmission circuit fail-safe with regard to any shorting or opening of the circuit or the components thereof.

Figure 3:
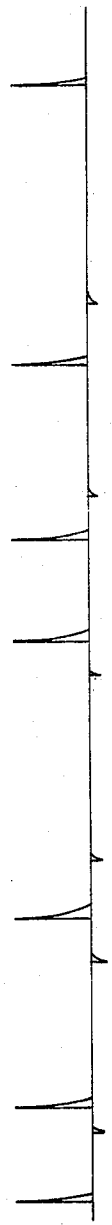
FIGURE 3 illustrates the wave form that is the output of the transmitter which is coupled into the reeciver as the input therefor.

In the transmitting circuit the RC network established by $R_1$, $C_1$ increases the time during which the very short pulse signal is effective. While this is not essential it does add to the reliability of operations of the circuit. This pulse signal is separated from the 60-cycle supply by means of the separating or filter network identified as $R_2$ and $C_2$. $R_2$ is preferably a wire wound resistor across which a voltage drop is developed by the pulse current established at avalanche ($R_2$ can also be a transformer or inductor). $C_2$ is of such a value as to pass the high frequency pulse while rejecting the 60-cycle source. The separated pulse voltage is thus established between the conductor 20 and ground. FIGURE 3 depicts this separated wave form with the negative going pulse being attenuated by shunting to ground through a suitable diode connected to ground for purposes concerned with operation of the receiver as later described. The fuse 18, which may be $\frac{1}{32}$ amp., will cause an opening of the transmitter circuit incident to an overload as a result of the developing of a short.

Figure 2A:
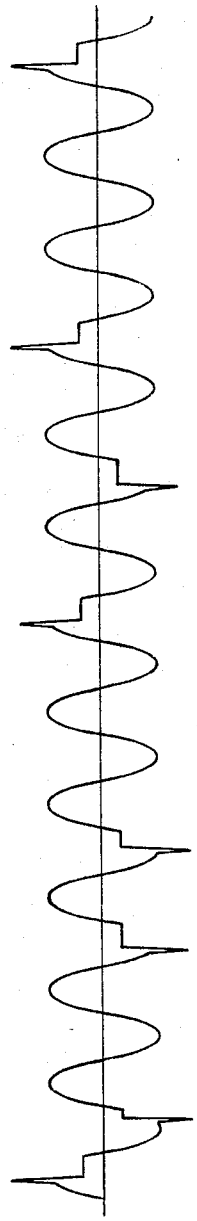
FIGURE 2A depicts the wave form produced in the transmitting circuit incident to the firing of the glow discharge tube where the tube is heavily loaded.

In the event that the UV tube is heavily loaded rather than lightly loaded as would be the case if the capacitor $C_1$ were eliminated from the circuit or made very large, then the tube would not be able to recover after the avalanche and would continue to carry current until the supply voltage dropped below the cut-off level of the tube. FIGURE 2A represents the wave form produced in the transmitter under such conditions. The separated signal leaving capacitor $C_2$ would still be of the nature shown in FIGURE 3.

The lightly loaded circuit is several times more sensitive than the heavily loaded circuit. In the heavily loaded circuit high energy photons are required to produce sufficient ionization of the gases within the tube to cause an avalanche. In the lightly loaded circuit photons of much lower energy content but of the proper wave length are sufficient to partially ionize the tube thus causing the pulse to be emitted (avalanche) but the tube is capable of recovering and thus does not lose control. The wave form of FIGURE 2 illustrates the frequency of operation with a lightly loaded circuit. The wave form of FIGURE 2A illustrates the lower frequency of avalanche occurring from the same energy source. It is for this reason that the lightly loaded circuit is preferred thereby taking advantage of the greater sensitivity obtained therewith. However, it is to be understood that the heavily loaded circuit although less sensitive is within the purview of the invention with this circuit distinguishing and separating the signal produced incident to sensing the flame from supply potential of the transmitter.

With this transmitter circuit, should there be a short of the leads to the UV tube, to which prior art organizations have been susceptible, or should there be a short or an opening of any of the components of the circuit the normal pulse signal produced by the transmitter and indicating the presence of a flame will no longer be present wherefore the transmitter is fail-safe or in other words produces a "no flame" signal incident to a malfunction of the circuit. If the UV tube shorts. the pulse signal will no longer be produced and moreover fuse 18 will blow. If $R_1$ and/or $C_1$ short, no detrimental effect will be produced although the duration of the pulse will be decreased and the sensitivity of the circuit will be decreased. If $R_1$ or $C_1$ open, the signal will no longer be produced. If $R_2$ shorts, the signal will no longer be produced through $C_2$ and if $C_2$ shorts, no detrimental effect will be produced unless the corresponding series connected capacitor in the receiver shorts in which case fuse 18 will blow and the signal no longer produced. Should the transformer short, the signal would no longer be produced.

The transmitter of the flame detector of the invention thus produces a pulse signal of very short time duration which pulse signal is separated from the supply which powers the transmitter and is coupled into the receiver as the input therefor. The transmitter is an extremely simple electrical circuit including the fuse 18, tube UV, $R_1$, $C_1$ forming a pulse shaping or delay network to increase the duration of the pulse and $R_2$ all of which are in series and connected across the secondary 16 of the transformer 14. $R_2$ in cooperation with $C_2$ forms the signal separating network for separating the pulses from the transformer supply potential. Several of the UV tubes may be connected in parallel in a single transmitter with two such tubes being illustrated. This would be desirable when there may be two or more burners or where it is desired to view the flame of a single burner from more than one location.

More than a single transmitter may be operated from the secondary 16 of the transformer. In the illustration of FIGURE 1 two transmitters are connected in parallel across the transformer secondary with the second transmitter being identified as 12' and containing the same components as previously described with transmitter 12. This number can be increased so that eight or more flame detectors may be operated from a single transformer if desired. This is of considerable advantage in large furnace installations wherein as many as 24 flame detectors are utilized with a single furnace. When multiple transmitters are employed with a single transformer, the capacitor $C_3$ is connected across the secondary as a filter to prevent the signal spikes of one transmitter from interacting on other signal separators and UV sensing tubes.

Figure 3A:
FIGURE 3A illustrates the wave form produced in the receiver through the switching action effected by the pulse output of the transmitter. Also illustrated in dotted lines in FIGURE 3A is the integrated wave form that appears across the load or output of the receiver.

The receiver of the flame detector of this invention receives the separated pulse signal from the transmitter as its input signal with the pulse signal actuating a switching device in the receiver and with the receiver being operative to develop a driving or power signal that is applied to a load for activating the same. In the illustrative organization of FIGURE 1 the pulse signal output of the transmitter is coupled into the receiver through the capacitor $C_4$ which acts to further filter any 60-cycle supply of the transmitter from the signal with the capacitors $C_2$ $C_4$ providing a safety feature in that satisfactory be obtained if one of these two capacitors should become shorted. The supply potential for the receiver in this illustrative embodiment is a half wave supply and is obtained from the 60-cycle 118 volt source 10. Half wave rectification of the supply is obtained by the diode $D_1$. The receiver, in effect, switched on and off by the Silicon Control Rectifier identified as SCR. The negative voltage pulse received from the transmitter are shorted to ground through diode $D_2$ while the positive pulses are operative to gate the SCR on with the lead 20 being connected to the gate of the SCR. Once it is gated on the SCR completely loses control and the SCR conducts until its anode to cathode voltage is reduced to a very low value. Accordingly, the SCR is gated on in accordance with the pulse output of the transmitter (this being a random repetition rate when the tube UV is operated out of saturation) providing a driving signal in the receiver. This driving signal or current flow through the receiver is applied to the load relay $R_L$ which, when energized, may cause suitable contacts to actuate an alarm or any other desired equipment. Connected across this load relay is holding capacitor $C_5$ which is effective to store up a sufficient charge to maintain the relay closed during the short intervals when no current is flowing through the receiver with $R_L$ and $C_5$ forming a tank circuit. Thus the relay is continuously engaged as long as the pulse signal output of the transmitter is received by the receiver. The $R_L$, $C_5$ network acts as an integrator with regard to the driving signal produced in the receiver providing partial integration of this signal. FIGURE 3A illustrates in solid lines the driving pulse produced through the triggering of the SCR while the dotted line wave form illustrates the partial integration of this driving signal that is produced by the $R_L$, $C_5$ network.

With the flame detector of this invention it is only necessary that the UV tube be mounted on the furnace and accordingly subjected to the severe operating conditions with relation to temperature, vibration, etc. existing at this location. The UV tube may be connected to the remaining components of the receiver through a two-wire coaxial cable which may be more than 500 feet in length. The coupling of the output signal of the transmitter to the input of the receiver may be through a two-wire coaxial cable that may be more than 200 feet in length thereby permitting the receiver to be located where desired.

Figure 4:
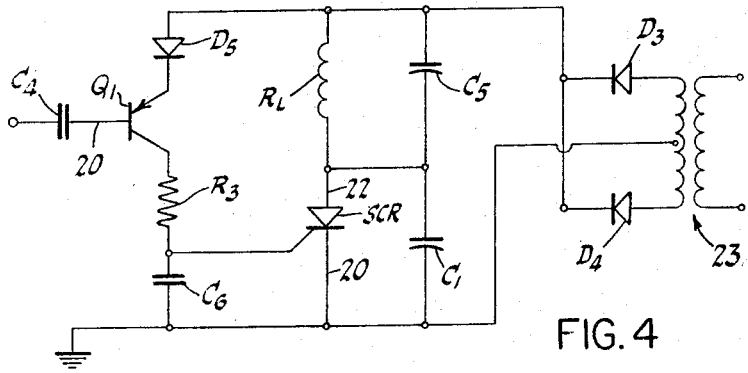

In lieu of applying the positive going output pulses of the transmitter directly to the gate of the SCR a switching transistor may be employed to receive the output pulses of the transmitter. FIGURE 4 illustrates a receiver circuit so arranged employing transistor $Q_1$ which is switched on by the negative going pulses of the output of the transmitter (in this circuit arrangement the shunting diode $D_2$ is not employed). This receiver of FIGURE 4 has a full wave power supply employing a center tap transformer 23 with diodes $D_3$ and $D_4$ and with the trnasistor $Q_1$ connected, as disclosed, across this power supply. The input signal to $Q_1$ is applied to the base to which lead 20 is connected and during the time that the transistor is switched on capacitor $C_6$ is charged to a desired value. The resistor $R_3$ connected between the collector of $Q_1$ and the gate of SCR operates to limit the gate current to the SCR. Diode $D_5$ at the emitter connection is effective to provide reverse bias to $Q_1$. Capacitor $C_6$ increases the time constant of the gate pulse, which pulse applied to the SCR in contrast to the FIGURE 1 arrangement, is of constant value and will be amplified over that applied to the input at the base of the transistor $Q_1$. The driving signal produced by the firing of the SCR is similar to that produced in the FIGURE 1 organization with the actuation or activation of the load $R_L$ and the function of the capacitor $C_5$ being the same as that in the FIGURE 1 arrangement. Capacitor $C_7$ may be connected across the SCR in the manner disclosed to aid the SCR in recovering control of the anode 22 to cathode 24 voltage thus making the circuit more reliable in operation. Such a capacitor may be employed if desired in the other receiver circuits of the invention employing an SCR.

Figure 5:
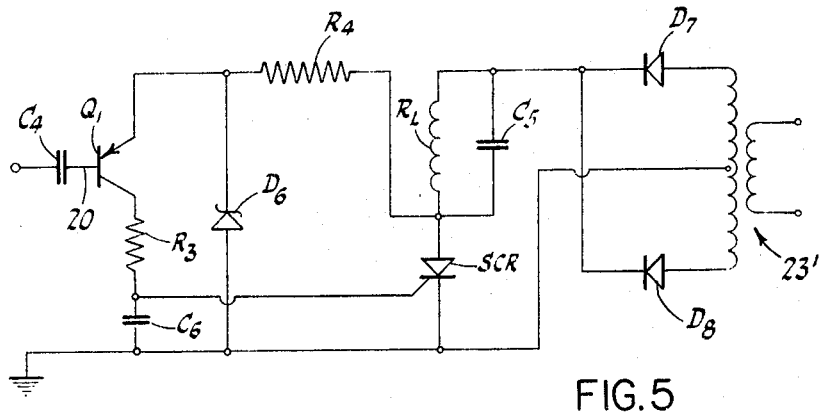

The receiver circuit of FIGURE 4 has a low voltage supply for use with the transistor $Q_1$ thus transformer 23 may step the voltage down from 118 v. A.C. to 24 v. A.C. This circuit may be converted to high voltage operation by adding a regulating diode and a droping resistor and by changing the ratings of the other components of the circuit for high voltage application. FIGURE 5 shows the receiver circuit thus converted. The regulating diode $D_6$ in combination with the dropping resistor $R_4$ is operative to limit the voltage applied across the emitter and collector of the transistor with a 15-volt Zener diode having proved satisfactory for this purpose. The operation of this receiver is similar to that of FIGURE 4 with the transistor $Q_1$ being used in pulse duty only and providing a switching action in accordance with the receipt of the varying repetition rate pulses from the transmitter to thus produce pulses to trigger the SCR. The supply voltage to the receiver circuit of FIGURE 5 may be 120 volts with full wave rectification and with a center tap secondary of transformer 23' being illustratively shown to obtain this supply. The diodes $D_7$ and $D_8$ are employed with the center tap circuit arrangement to provide the necessary rectification for the full wave supply.

Figure 6:
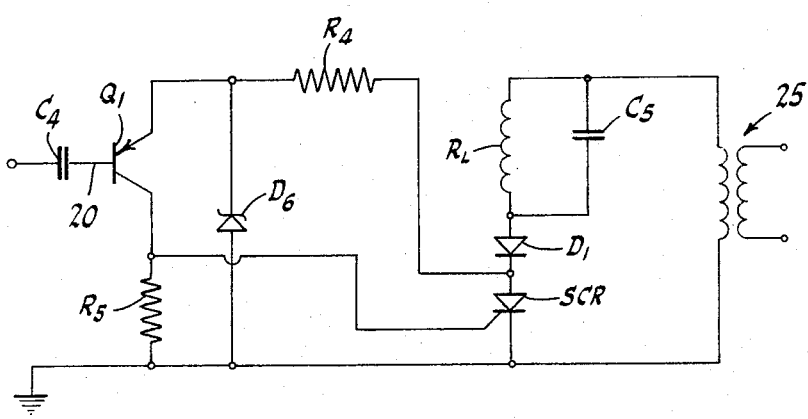

In lieu of employing a full wave power supply as disclosed in FIGURE 5 a half wave supply may be employed for this receiver circuit, with FIGURE 6 showing such an arrangement wherein the supply voltage as obtained through transformer 25 may be 120 volts. In this FIGURE 6 organization a voltage pulse is developed across the resistor $R_5$ when the transistor $Q_1$ is switched on with the pulse being effective to trigger the SCR of the receiver and accordingly providing a driving signal as described with relation to the circuit of FIGURE 1. Note that the higher voltage SCR's (FIGURES 5 and 6) require shorter gating times and therefore $C_6$ (FIGS. 4 and 5) may be omitted as is done in the FIGURE 6 circuit.

In the circuits of FIGURES 4, 5 and 6 the transistors $Q_1$ may be replaced by a uni-junction if desired with these components being interchanged in these circuits.

Figure 7:
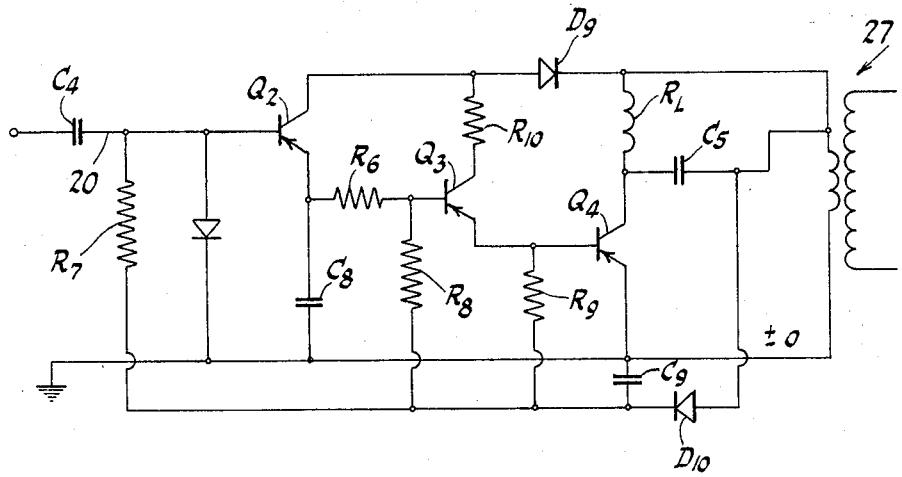
FIGURES 4, 5, 6 and 7 illustrate varying circuit designs for the receiver and which may be utilized with the present invention.

In each of these circuits of FIGURES 1, 4, 5 and 6 the driving signal produced in the receiver is obtained through the triggering of the SCR. While this provides a very simple and reliable receiver, the receiver circuit is not limited to the use of an SCR and other circuit designs which will produce a driving signal in the receiver for energization of the receiver load may be utilized. FIGURE 7 illustrates a transistorized receiver employing a switching transistor and two transistorized amplifying stages. In this circuit the load relay is a low voltage device operating within voltages comparable to the transistor "state of the art." The input signal is coupled into the receiver at the base of the transistor $Q_2$ turning the transistor on and off in accordance with the pulses as previously described. The power supply for the transistorized receiver may be half wave or full wave voltage supply with a half wave supply being illustrated. For example, the power transformer 27 may have 118 volts 60-cycle primary source producing 12.6 volts A.C. on the secondary. Diode $D_9$ (FIGURE 7) provides the necessary half wave rectification. The circuit of transistor $Q_2$ is an emitter follower so that the output closely follows the input but with a current gain approximately that of the transistor gain. The emitter-collector current is limited by the resistor $R_6$. $C_8$ acts to store some of the energy of $Q_2$ to maintain $Q_3$ turned on between signal pulses to $Q_2$. The input circuit of this transistorized receiver is thus substantially the same as the inputs of the receiver circuits of FIGURES 4, 5 and 6 with transistor $Q_2$ being used in pulse duty and with an amplified partially integrated pulse (through the action of $C_8$ and $R_6$) being applied to the direct coupled amplifier stages of the receiver. In the circuit of FIGURE 7 a reverse bias resistor $R_7$ is provided to keep $Q_2$ turned off at high temperatures with the reverse bias voltage being provided through diode $D_{10}$ and capacitor $C_9$. Transistors $Q_3$ and $Q_4$ are connected in common emitter amplifier configuration. The input is applied to the base of $Q_3$ with the gain of $Q_3$ being limited by $R_{10}$ connected between the collector and the source of potential with the emitter of $Q_3$ being connected with the base $Q_4$. The emitter of $Q_4$ is connected with the source while $R_2$ is connected with the collector. As in the case of the transistor $Q_2$, reverse bias loading is provided for $Q_3$ and $Q_4$ to compensate for high ambient temperatures with the bias for $Q_3$ being provided through $R_8$ and the bias for $Q_4$ being provided through $R_9$ and with the source of potentials for this bias being obtained through $D_{10}$ and $C_9$ as in the case of the reverse bias $Q_2$. The output of the amplifier is a varying signal which is applied to the load $R_L$ across which is connected the holding capacitor $C_5$ with the operation of the load relay being the same as that obtained with the FIGURE 1 receiver circuit.

The signal as impressed across the load of the receiver in each of the modifications is integrated sufficiently so that it is maintained above a sufficient level so long as the input of the receiver is transmitted thereto from the transmitter to activate the load. For instance, in a high voltage receiver circuit such as that of FIGURE 1 and 6 employing a high voltage relay the voltage across the relay may vary, for example from 80 to 150 volts with this variation being at a random rate but since the relay requires a considerably less potential than 80 volts such as 45 volts, to pull in and 25 volts to drop out, the relay will be maintained engaged as long as the output signal of the transmitter is coupled into the receiver.

In the event that there is a flame out and the transmitter signal thus terminated of the load relay of the receiver will "drop out" in a fraction of a second. Tests have shown that the relay drop out time may be between .1 and 1.5 seconds after a sudden and complete loss of flame. The amount of time after flame out to obtain a flame out indication at the receiver load, or in other words to obtain drop out of the relay, will depend upon the circuit components and primarily the capacitors with the design being such as to maintain drop out in a very short period of time.

In the operation of flame detectors it is desired that the sensing element respond only to energy emitted by the flame and not other energy sources such as the energy admitted by hot refractory or hot tubes or glowing carbon that may be in the vicinity of the flame. Accordingly, the detector of the present invention employing a glow discharge sensing tube utilizes a tube which responds to energy that lies generally within the spectrum range of 2000 to 3300 angstroms. Within this range the sensing tube will respond to photons admitted by the flame and will not respond to energy emitted from other sources such as glowing refractory. The wave lengths of the photons emitted by these other sources are somewhat above 3300 angstroms. Accordingly, the sensing tube operates in the ultraviolet spectrum range. In this designated range, i.e., between 2000 and 3300 angstroms, there exists a serious problem with regard to the detection of flames produced by burning of coal. The energy emitted from the coal fire in this spectrum range is rather limited being much less than that obtained with gas or oil fires and, accordingly, in order to detect coal fires by means of a glow discharge tube operating within this general spectrum, it is necessary that a very sensitive system be employed with so-called ultraviolet flame detectors of prior art design and as employed prior to applicant's invention being incapable of satisfactory operation with coal fires.

As explained hereinbefore when the UV tube is lightly loaded it is very sensitive, producing avalanches from relatively low energy photons and with the tube recovering after each such avalanche. By utilizing the flame detector circuit of this invention with the UV tube not being heavily loaded, it has been possible to detect the presence or absence of flame in a coal fired installation in an entirely satisfactory manner with the result being accurate and dependable. Accordingly, with the invention there is provided a flame detector system which operates satisfactorily on either gas, oil or coal firing and which is selectively responsive with regard to the energy spectrum range over which it is sensitive so that false indications of the presence of a flame are avoided.

The load as identified as $R_L$ in the various receiver circuits may take a variety of forms. It may be a relay which can operate a switching mechanism such as closing a switch when energized to provide an alarm either audible or visible or open a switch when energized and close a switch when de-energized to activate a suitable alarm. A relay may open one switch when energized and close another upon de-energization closing said one switch and opening said other switch with indicators being energized upon closing of the respective switches. Furthermore, the $R_L$ may not be a relay at all but rather may be the input load to a computer or signal static device, not requiring an intermediate relay. Still further, the $R_L$ may be a plurality of loads for instance relays, computers, lights, etc., all driven simultaneously from the same receiver.

While the potential source for the transmitter and receivers, as described hereinbefore, is stated to preferably be a 60-cycle per second source, this is by way of example only and is utilized merely because of its ready availability. It will be understood that the source for the transmitter and receiver may be any desired frequency so long as proper operation of the components of the circuits, for example the tube of the transmitter and the SCR of the receiver, may be obtained and so long as the period of the source is substantially longer (many times) than the time duration of the pulse produced in the circuit incident to avalanche (well over a millisecond) occurring in the tube so that the signal separator network can separate the pulse signal train from the A.C. source. From known pulse techniques it is considered that a difference of ten to one is desirable and will provide for ease of separation of the signals. In other words, the effective frequency of the pulse should be ten times the frequency of the supply. It should be noted that with the tube lightly loaded so that it immediately returns to its high impedance state after avalanche, the source for the transmitter may be a D.C. potential although for ease of circuit design an A.C. source is preferred.

Accordingly, with the present invention there is provided a flame detector utilizing a glow discharge tube as the sensing element and having a circuit which is simple and reliable with the detector being considerably more sensitive than so-called "UV" flame detectors of heretofore known design and with it being necessary to mount only the detector tube on the furnace within which the flame is to be detected.

While I have illustrated and described a preferred embodiment of my invention, it is to be understood that such is merely illustrative and not restrictive and that variations and modifications may be made therein without departing from the spirit and scope of the invention. I therefore do not wish to be limited to the precise details set forth but desire to avail myself of such changes as fall within the purview of my invention.

What I claim is:

1. A flame detector comprising in combination a source of potential, a glow discharge sensing tube connected to the source of potential and having in series therewith an integrating network and a load impedance across the latter of which an output spike signal is developed incident to avalanche occurring in said tube, a receiver having an input and an output and including a source of potential, a silicon controlled rectifier having its anode and cathode across said source, a load controlled by said silicon controlled rectifier, means providing a high impedance to said source of potential connected to the sensing tube and a low impedance to the spike signal capacitively coupling said output spike signal into the input of the receiver with the silicon controlled rectifier being gated on in response to such coupling of said signal.

2. The detector of claim 1 wherein said receiver includes a transistor operated in pulse duty only with the output spike signal being coupled to the base of said transistor, means for increasing the time duration of the signal produced by application of said spike signal to said transistor and operative to couple this thus modified signal to the gate of the silicon controlled rectifier.

3. The detector of claim 1 wherein said output spike signal is coupled directly to the gate of the silicon controlled rectifier.

4. The flame detector of claim 2 including another transmitter connected to the source of potential and in parallel with said first transmitter, and a capacitor shunting said source of potential, said transmitter being adapted to have similar receiving means into which its output signal is coupled.

5. A flame detector comprising in combination a source of potential, a glow discharge sensing tube connected to the source of potential and having in series therewith a load impedance across which an output spike signal is developed incident to avalanche occurring in said tube, a receiver having an input and an output and including a source of potential, a silicon controlled rectifier having its anode and cathode across said source, a load comprising a relay in series with the silicon controlled rectifier and across which a holding capacitor is connected, means providing a high impedance to said source of potential connected to the sensing tube and a low impedance to the spike signal capacitively coupling said output spike signal into the input of the receiver with the silicon controlled rectifier being gated on in response to such coupling of said signal.

6. A flame detector comprising a glow discharge sensing tube operating in the ultra-violet spectrum range, an electric circuit into which said tube is connected and including a source of potential applied across the tube, said circuit having an impedance resulting in a lightly loaded tube so that it recovers immediately after avalanche whereby a pulse signal corresponding to a high frequency is produced with the frequency thereof being substantially higher than that of the supply, means for separating the pulse signal from the supply, means responsive to this separated signal and operative to produce a driving signal.

7. The flame detector of claim 6 wherein the means for producing said driving signal includes a silicon controlled rectifier connected to be gated on by the separated pulse signal.

No references cited.

RALPH G. NILSON, *Primary Examiner*.

A. R. BORCHELT, *Assistant Examiner*.